(12) United States Patent
Scott

(10) Patent No.: US 6,367,573 B1
(45) Date of Patent: Apr. 9, 2002

(54) CYLINDER MOUNT FOR FUEL SYSTEM

(75) Inventor: Jeffrey D. Scott, Glencoe, AL (US)

(73) Assignee: Fab Industries, LLC, Anniston, AL (US)

( * ) Notice: Subject to any disclaimer, the term of this patent is extended or adjusted under 35 U.S.C. 154(b) by 0 days.

(21) Appl. No.: 09/400,640

(22) Filed: Sep. 20, 1999

(51) Int. Cl.$^7$ .............................................. B60K 15/03
(52) U.S. Cl. ...................... 180/314; 180/69.5; 280/834; 137/267; 62/45.1; 296/178
(58) Field of Search ............................... 180/314, 69.4, 180/69.5; 280/831, 833, 834, 835, 783, 830; 141/18, 4; 137/255, 263, 266, 267; 62/50.1, 45.1, 48.1, 48.2; 296/178

(56) References Cited

U.S. PATENT DOCUMENTS

| | | | | |
|---|---|---|---|---|
| 2,492,165 A | * | 12/1949 | Mapes .......................... | 62/50.1 |
| 2,972,873 A | * | 2/1961 | Peet et al. ................... | 137/48.1 |
| 3,066,495 A | * | 12/1962 | Biggins et al. ............. | 137/48.2 |
| 5,054,799 A | * | 10/1991 | Fingerle ................. | 280/833 X |
| 5,193,580 A | * | 3/1993 | Wass et al. | |
| 5,476,189 A | * | 12/1995 | Duvall et al. ................ | 220/590 |
| 5,685,350 A | * | 11/1997 | Chowdhury | |
| 6,042,071 A | * | 3/2000 | Watanabe et al. ...... | 180/69.5 X |
| 6,112,760 A | * | 9/2000 | Scott et al. .................. | 137/255 |
| 6,240,989 B1 | * | 6/2001 | Masoud ....................... | 150/149 |

FOREIGN PATENT DOCUMENTS

| | | | |
|---|---|---|---|
| JP | 11245673 | * | 9/1999 |
| JP | 2000-127860 | * | 5/2000 |
| JP | 2000-127861 | * | 5/2000 |

OTHER PUBLICATIONS

Paper Titled Evolution of CNG Bus Fuel Systems, May 1998.*
Orion Bus Industries Drawing SK1400–0083, Feb. 2000.*
Lincoln Composites DWG. Titled "15.9 Installation", Jul. 1997.*
Exhibit A shows one example of a prior art roof mounted CNG fuel system for a transit bus is that manufactured by New Flyer. (Jul. 15, 1996).
Exhibit B illustrates another prior art roof mounted CNG fuel supply system for transit buses is that in use by Orion Bus Industries. (undated but admitted to be prior art).
Exhibit C is an illustration of a prior art fill block (undated but admitted to be prior art).
Exhibit D is a manual for a prior art fuel system sole by Neoplan USA Corp. (Oct. 1996).
Exhibit E is a copy of NFPA52 Compressed Natural Gas (CNG) Vehicular Fuel Systems Code 1998 Edition. Section 3–5.2 deals with the mounting of fuel lines. (1998 admitted to be prior art).
Exhibit F is a copy of Los Angeles County Metropolitan Transportation Authority DR4202 Technical Requirements. Section 13.9 deals with the fuel system, and Section 13.9.2 requires that the fuel cylinders be mounted on the roof in such a manner that replacement of one cylinder shall not require the removal of additional cylinders. (undated but admitted to be prior art).

* cited by examiner

*Primary Examiner*—Brian L. Johnson
*Assistant Examiner*—Bryan Fischmann
(74) *Attorney, Agent, or Firm*—Waddey & Patterson; Lucian Wayne Beavers

(57) ABSTRACT

A CNG fuel tank system is provided for mounting on the roof of a bus. The system includes a support frame mounted on the roof of the bus. The support frame includes at least one longitudinal frame wall extending generally parallel to the length of the bus. Each tank cylinder has associated therewith first and second saddles which are attached to one side of one of the frame walls. Each saddle has a base oriented vertically and engaging in the first frame wall. Each saddle includes an arcuate recess spacing sideways from this frame wall. Each tank cylinder is received in the arcuate recesses of the saddles associated therewith. Each saddle has associated therewith first and second strap assemblies which extend around the tank cylinder to secure the tank cylinder to the saddles and thus to the support frame. Preferably, a set of four parallel tanks are mounted in the fashion described on two parallel longitudinal frame walls. There is one tank hung in a cantilever mode off either side of each frame wall. A center support is provided between the two center tanks for supporting a tank cover. One of the inner tanks may be removed without removing any of the other tanks. This is accomplished due to the cantilever mode mounting of the tanks and due to the removeability of the center support.

14 Claims, 13 Drawing Sheets

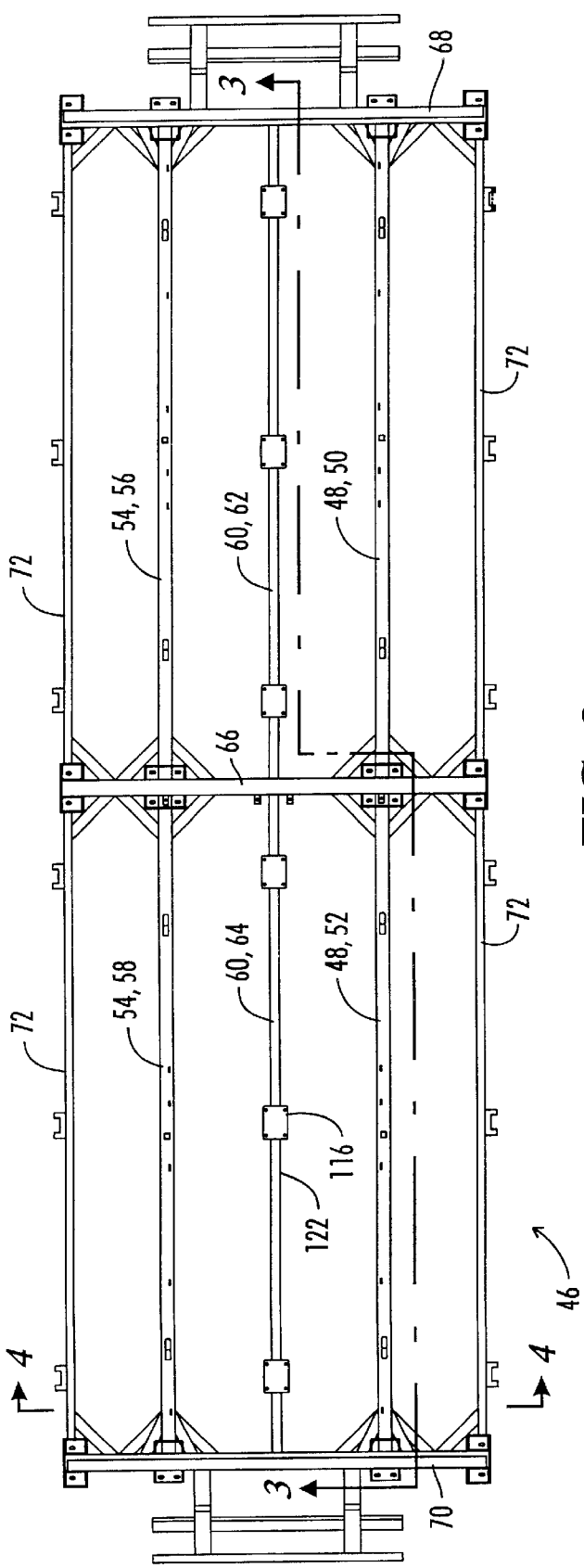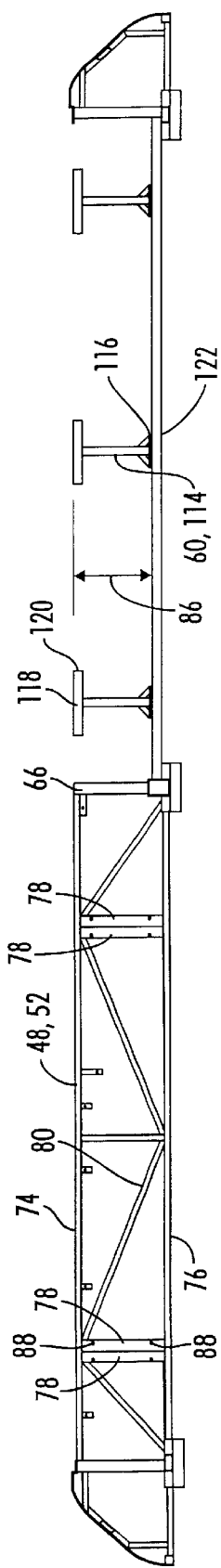
FIG. 2
FIG. 3

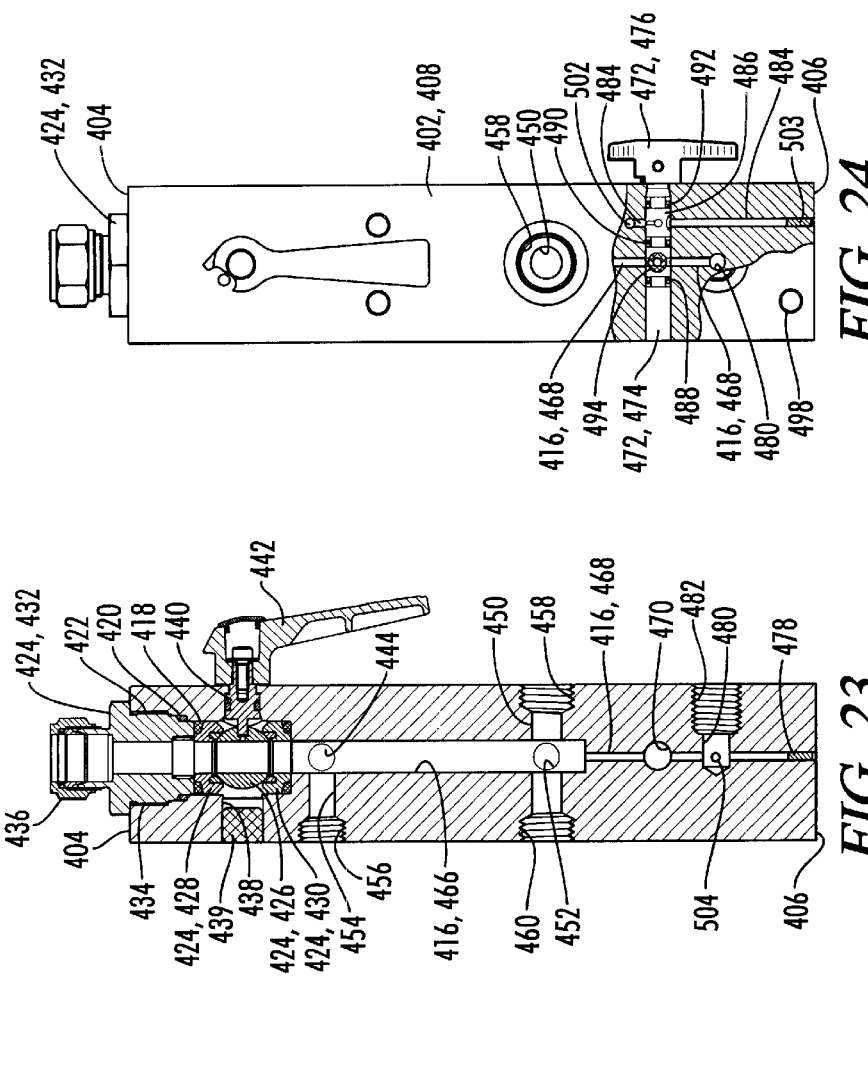
FIG. 24
FIG. 23
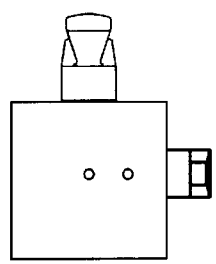
FIG. 25

CYLINDER MOUNT FOR FUEL SYSTEM

BACKGROUND OF THE INVENTION

1. Field of the Invention

The present invention relates generally to mounting apparatus for fuel supply systems for providing compressed natural gas (CNG) fuel to a transit bus or the like.

2. Description of the Prior Art

One type of fuel tank which is used for CNG fuel supply systems for transit buses and the like is a Type 4 tank. Type 4 tanks utilize a plastic liner with a carbon fiber overwrap. The tanks are supported by a pair of saddles and strap assemblies which typically support the tank at approximately ¼ of the distance from either end of the tank.

In the prior art, Type 4 tanks have been mounted on the top of transit buses and have been mounted by placing the two saddles immediately below their respective tanks. One shortcoming which occurs from this prior art arrangement is that the inner tanks of a set of four side-by-side tanks cannot be removed without first removing the outer tanks. This is because the strap arrangement cannot be fully opened due to interference with adjacent structures.

Accordingly, it is seen that there is a need for a system for mounting Type 4 tanks which allows inner tanks to be removed from a set of multiple side-by-side tanks, without removing the outer tanks.

SUMMARY OF THE INVENTION

The present invention provides a CNG fuel tank system for mounting on the roof of the bus, the bus having a length and a width. The system includes a support frame to be mounted on the roof of the bus. The support frame includes a first longitudinal frame wall extending generally parallel to the length of the bus. The first frame wall has a wall height extending vertically from the roof of the bus.

First and second saddles are attached to one side of the first frame wall, each saddle having a base oriented vertically and engaging the first frame wall. Each saddle includes an arcuate recess facing sideways from the first frame wall.

A first cylinder tank extends parallel to the first frame wall and is received in the arcuate recesses of the first and second saddles. First and second strap assemblies, associated with the first and second saddles, respectively, extend around the tank cylinder to secure the tank cylinder to the saddles and thus, to the support frame.

Thus, in the manner just described, the first tank cylinder is hung in a cantilever mode from one side of the first longitudinal support frame.

The tank mount just described is for a single tank, and describes the cantilever mode of supporting that tank from the first longitudinal frame wall.

Preferably the system includes four side-by-side tank cylinders, two of which are hung in a cantilever mode on either side of the first longitudinal frame wall, and the third and fourth of which are hung in a cantilever mode from either side of the second longitudinal frame wall.

The system further includes a removable central support located between the two inner tank cylinders, for supporting a cover assembly over the tank cylinders. The central support is removable from the support frame to permit removal of either of the inner tank cylinders without removing any of the other tank cylinders.

Each of the strap assemblies of an inner tank cylinder includes a longer strap portion which underlies the inner tank cylinder and a shorter strap portion which overlies the inner tank cylinder. The strap portions have their ends pivotally connected to their associated saddle, and their free ends include a releasable connection therebetween.

It is therefore, an object of the present invention to provide an improved CNG fuel supply system for a transit bus or the like.

Another object of the present invention is to provide improved apparatus and methods for mounting fuel tank cylinders on a rooftop of a bus.

Still another object of the present invention is the provision of a system for mounting multiple Type 4 tank cylinders side-by-side on the roof of the bus, and being able to remove the inner tank cylinders without having to remove any of the other tank cylinders.

Other and further objects, features and advantages of the present invention will be readily apparent to those skilled in the art upon a reading of the following disclosure when taken in conjunction with the accompanying drawings.

BRIEF DESCRIPTION OF THE DRAWINGS

FIG. 2 is a plan view of the support framework for supporting the cylindrical tanks on the roof of the bus.

FIG. 3 is a side elevation partly sectioned view of the support framework of FIG. 2, taken along line 3—3 of FIG. 2.

FIG. 23 is a left side elevation view similar to that of FIG. 20, but having part of the upper portion cut away to show the internal details of construction of the ball valve.

FIG. 24 is a view similar to FIG. 19 having a portion thereof cut away to show the details of construction of the defueling valve.

FIG. 25 is a bottom end view of the fill block.

DESCRIPTION OF THE PREFERRED EMBODIMENTS

Figure 1:
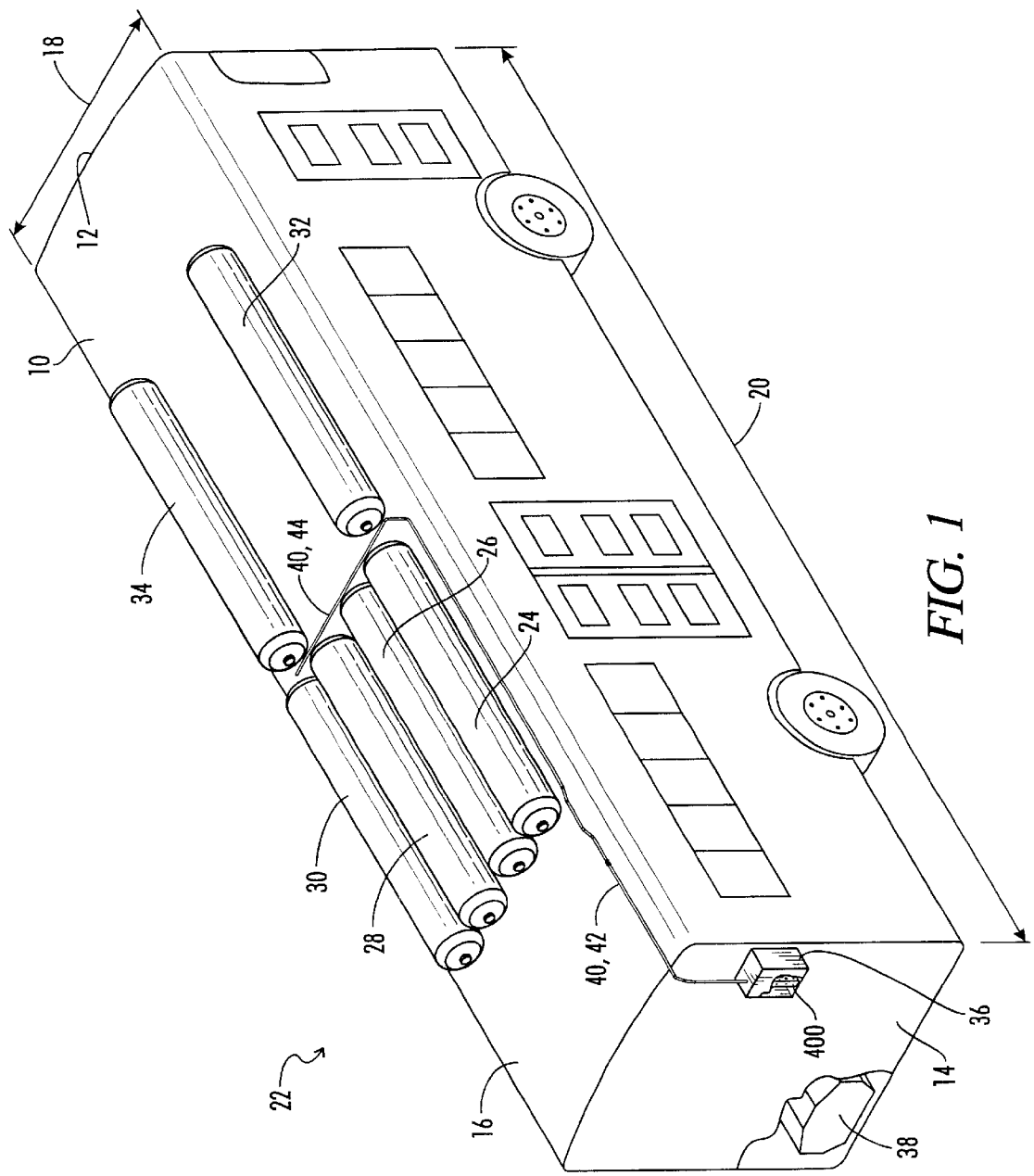
FIG. 1 is a perspective schematic view of a transit bus having a roof mounted CNG fuel supply system.

Referring now to FIG. 1, a bus is shown and generally designated by the numeral 10. The bus 10 has a front 12, a rear 14, and a roof 16. The bus has a width 18 and a length 20.

A CNG fuel system for the bus is generally designated by the numeral 22.

The fuel system 22 includes a plurality of rearward tank cylinders mounted on the top of the bus and extending parallel to the length 20 of the bus. The plurality of rearward tank cylinders includes first cylinder 24, second cylinder 26, third cylinder 28 and fourth cylinder 30. The system 22 also includes a plurality of forward tank cylinders including fifth tank cylinder 32 and sixth tank cylinder 34.

The tanks are NGV (Natural Gas Vehicle) Type 4 fuel containers certified to U.S. DOT FMVSS (Federal Motor Vehicle Safety Standards) 304 and the 1998 version of ANSI/IAS (American National Standards Institute/ International Approval Service) NGV-2, the details of which can be obtained from the American National Standards Institute in New York, N.Y. Such tanks can be obtained from Lincoln Composites of 6801 Cornhusker Highway, Lincoln, Nebr. 68507. Type 4 tanks utilize a plastic liner with a carbon fiber overwrap. The tanks are supported by a pair of saddles and strap assemblies which typically support the tanks at approximately ¼ the distance from either end of the tank. Such tanks are referred to throughout this application as Type 4 tanks.

A fill box 36 is mounted on the rear of the bus adjacent the curb side. The fill box 36 contains a fill block, filters, pressure regulators and the like, which are a typical part of a CNG fuel system. The fill box 36 provides a location where CNG can be provided from a source to fill the system 22.

The rear 14 of the bus is partially cut away in FIG. 1 to schematically illustrate the location of the engine 38. A fuel line (not shown) runs from the fill box 36 to the engine 38.

A manifold line 40 includes a first lengthwise portion 42 which runs along the length of the bus to a location between the front and rear tank cylinders, and then the manifold line 40 includes a transverse portion 44 which runs at least partially across the width of the bus between the forward tank cylinders 32, 34 and the rearward tank cylinders 24–30. As is further described below with regard to FIG. 5, the transverse portion 44 of manifold line 40 is connected to each of the tanks 24–34.

The Support Frame

FIG. 1 is a schematic illustration and generally shows the location of the tanks 24–34. The tanks 24–34 are actually supported upon the roof 16 of the bus by means of a support frame 46 which is shown in FIGS. 2 and 3. The support frame 46 is mounted on the roof 16 of bus 10.

The support frame 46 includes a first longitudinal frame wall 48 having a forward portion 50 and a rearward portion 52. The support frame 46 further includes a second longitudinal frame wall 54 including a forward portion 56 and a rearward portion 58.

The first longitudinal frame wall 48 has a height 86 extending vertically from the roof of the bus.

Support frame 46 further includes a removable central support 60 having a forward portion 62 and a rearward portion 64.

Support frame 46 includes a center transverse wall 66 to which the forward and rearward portions of first and second walls 48 and 54 and removable central support 60 are attached to join those forward and rearward portions.

Support frame 46 further includes a forward transverse wall 68 to which the forward ends of each of the longitudinal walls are attached, and a rearward transverse wall 70 to which the rearward ends of each of the longitudinal walls are attached. The transverse outer ends of the three transverse walls are connected by hinge support tubes 72.

In the side elevation view of FIG. 3, to the left of center transverse wall 66, the details of the rear portion 52 of the first longitudinal frame wall 48 are shown. To the right of center transverse wall 66 in FIG. 3 the first longitudinal frame wall 48 is cut away to show the details of construction of the removable central support 60. As is there apparent, first and second longitudinal frame walls 48 and 54 are constructed as trusses having upper and lower beams 74 and 76 separated by a plurality of vertical columns 78 and cross braces 80.

Figure 4:
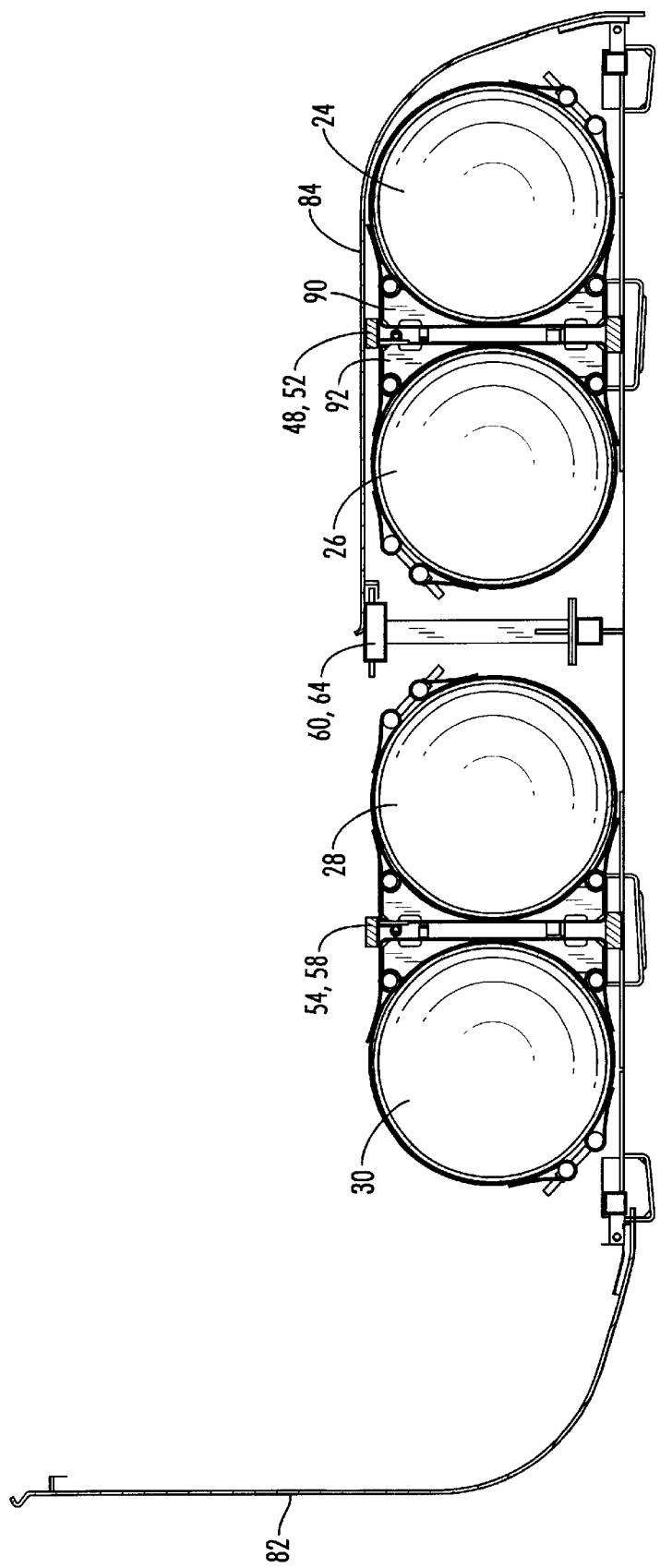
FIG. 4 is an end elevation view taken along line 4—4 of FIG. 2 and showing four tanks in place, and also showing the tank cover which is supported upon the framework.

The removable central support 60, on the other hand, is not supporting any substantial weight, because its sole purpose is to support the outer cover doors 82 and 84 as seen in FIG. 4. The cover doors 82 and 84 are hingedly connected to the hinge support tubes 72 and their interior edges rest on top of the removable central support 60 as seen in FIG. 4. In FIG. 4, the left side door 82 is pivoted open, and the right side door 84 is shown closed.

The first and second longitudinal frame walls 48 and 54 provide the structural support for the tanks 24–34 as is further described below with regard to FIGS. 4 and 5.

With reference to the plan view of FIG. 2, it will be understood that the first tank 24 will lie between rear section 52 of wall 48 and the adjacent outer hinge tube 72, and between the center transverse wall 66 and rearward transverse wall 70. The second tank 26 will lie parallel thereto on the opposite side of the rear section 52 of first longitudinal wall 48. The third tank will lie parallel thereto between the rear section 64 of center support 60 and the rear section 58 of second longitudinal wall 54. The fourth tank will lie on the opposite side of rear section 58 of second wall 54.

The fifth tank will lie longitudinally between center transverse wall 66 and forward transverse wall 68, and will lie between the forward section 50 of first wall 48 and the adjacent outer hinge support tube 72. The sixth tank will lie parallel thereto between the forward section 56 of second longitudinal wall 54 and the adjacent outer hinge support tube 72.

Figure 5:
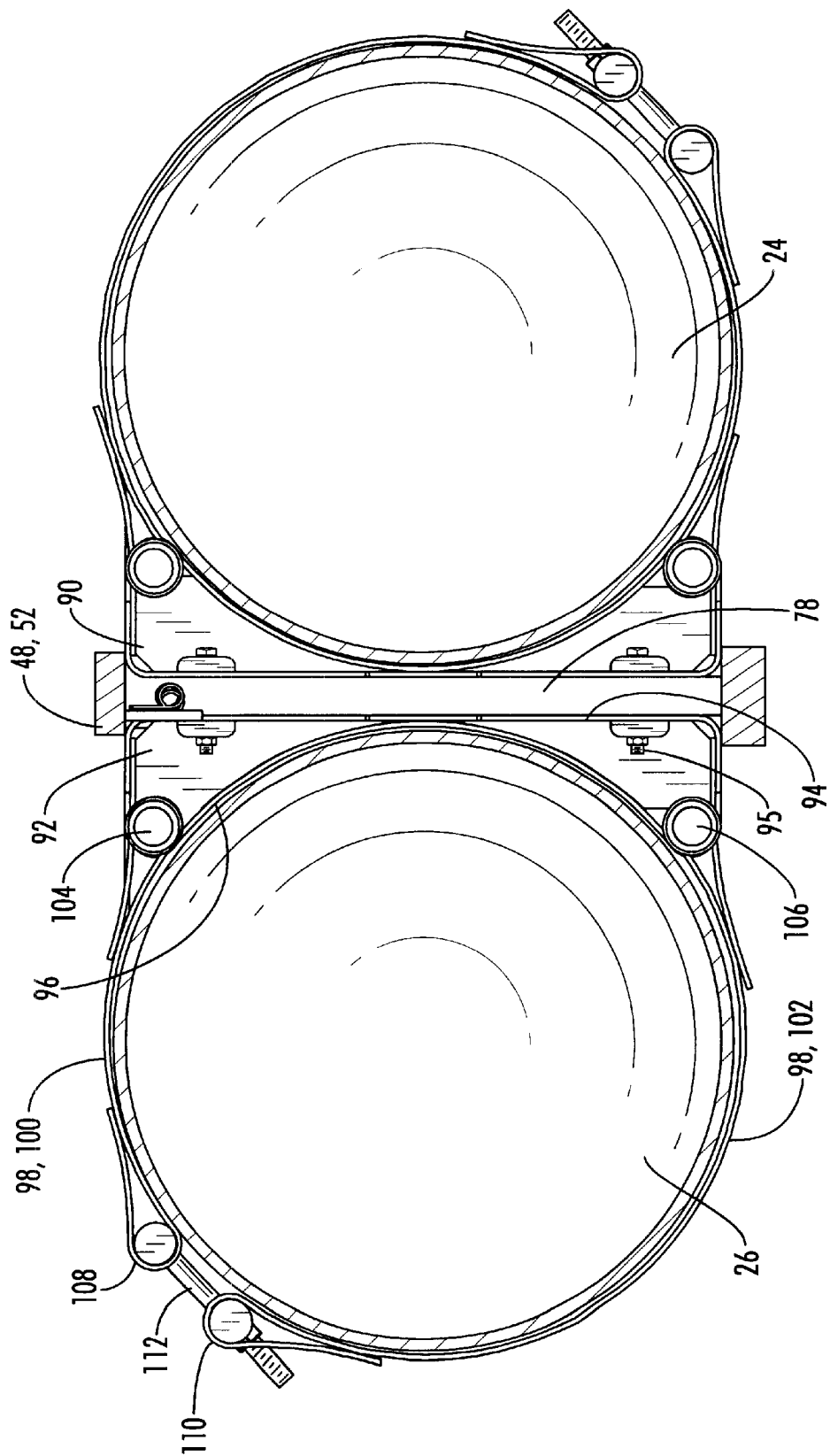
FIG. 5 is an enlarged end elevation view showing the mounting of two of the tanks to a first longitudinal frame wall of the support frame.

As is best illustrated in FIGS. 4 and 5, the first and second tanks 24 and 26 are supported in a cantilever mode from the rear section 52 of first longitudinal frame wall 48. This is accomplished as follows.

Referring to FIG. 3, it is seen that the rearward section 52 of first longitudinal frame wall 48 includes four of the vertical columns 78 which are arranged in two back-to-back pairs of column 78. Each column 78 carries two mounting holes 88. As further illustrated below with regard to FIGS. 4 and 5, each set of four mounting holes 88 is utilized to mount two back-to-back saddles such as 90 and 92.

Each saddle member, such as saddle member 92 includes a vertically oriented planar base surface 94 and an arcuate recessed surface 96 facing laterally outward, i.e. sideways, from the first frame wall 48.

A plurality of bolts 95 extend laterally through the saddles 90 and 92 and through the bolt holes 88 of vertical column members 78 of wall 48, to attach the saddle members 90 and 92 to the wall 48.

The tank 26 is received in the arcuate recess 96 and held therein by a strap assembly 98 comprised of a shorter strap member 100 and a longer strap member 102. The shorter strap member 100 is pivotally attached to saddle 92 at pivot 104. The longer strap member 102 is pivotally attached to saddle 92 at lower pivot 106. The shorter and longer strap members 100 and 102 have free ends 108 and 110, respectively, which are joined together by a bolt 112 to tighten the strap assembly 98 about the tank 26 to hold it in place within the recess 96 of saddle 92. Bolt 112 provides a releasable connection between strap members 100 and 102.

Referring again to FIG. 3, it is seen that there is one pair of vertical column members 78 near the rear end or left hand side of FIG. 3 and a second pair of vertical column members 78 to the right thereof nearer the center transverse wall 66. For each tank there will be two of the saddle members such as 90, one of which is mounted to each of these two locations which correspond to approximately the quarter points from the ends of the tank.

It is noted that the saddle member 92 and associated strap assembly 98 are themselves a part of the prior art and are provided by the manufacturer as part of a Type 4 tank. In the prior art, however, the saddle members 92 have always been mounted in a horizontal orientation with the recess 96 facing upward and thus supporting the tanks in a compressive mode, not a cantilever mode. The re-orientation of the saddle members vertically and thus the mounting of the tanks in a cantilever mode from vertical wall 48 is a novel part of the present invention.

With the vertical orientation of the saddles utilized in the present invention for the two inner tanks 26 and 28, the longer strap portion 102 should be connected to the lower end of the saddle 92 as at 106 so that the longer strap portion underlies the tank and so that the shorter strap portion 100 overlies the tank. For the outer tanks 24 and 30 this arrangement is reversed and the longer strap is placed on top.

Although in FIG. 5, two tanks 24 and 26 are shown hung in a cantilever mode off opposite sides of the first longitudinal frame wall 48, a single tank can be hung in the same manner in a cantilever mode off either side of the wall. For example, the fifth tank is hung in a manner similar to tank 24 off the right hand side of the forward section 50 of the first frame wall 48.

When there are four tanks oriented side-by-side, such as in the group of four forward tanks 24, 26, 28 and 30 as seen in FIG. 4, the first and fourth tanks 24 and 30 may be referred to outer tanks, and the second and third tanks 26 and 28 may be referred to as inner tanks. The second and third tanks 26 and 28 are separated by, but are not attached to, the removable central support 60.

As previously noted, the center support 60 is removable and its basic purpose is to provide a support for the inner edges of the cover doors 82 and 84 as seen in FIG. 4. The removable central support 60 is constructed in a removable fashion so as to aid access to the inner cylinders 26 and 28 and to aid the removal of either of the inner cylinders 26 or 28 without removal of any of the other tank cylinders.

As previously noted, when u sing th e prior art mounting arrangement, such as that used by New Flyer wherein the saddle members are mounted horizontally below the tanks, the inner tanks cannot be removed, because the strap assemblies cannot pivot open wide enough to release them. Thus, with the prior art arrangement having horizontally mounted saddles, it is typically necessary to first remove the adjacent outer tanks, such as 24 or 30, before the selected inner tanks, such as 26 or 28, may be removed.

The removable construction of the removable central support 60 is best illustrated on the right hand side of FIG. 3. There it is seen that the center support 60 is made up of a plurality of removable support posts 114, each having a bolt plate 116 on its lower end and having a horizontally oriented box tube 118 at its upper end which has open ends, such as 120. The edges of cover doors 82 and 84 rest on the box tubes 118. The bolt plates 116 are bolted to a lower beam 122 which lies near the roof of the bus. Thus, to remove the center support 60 the bolt plates 116 are unbolted from the beam 122, and the posts 114 are removed.

Typically, when it is desired to remove one of the tank cylinders, and particularly one of the inner tank cylinders 26 or 28 that is accomplished as follows.

First, the support posts 114 of center support 60 are unbolted from beam 122 and removed.

Then, a lifting device such as a set of straps and cables are placed around the tank at one or more locations (not shown).

Then, the strap assemblies 98 of the selected tank are removed by loosening the bolts 112 thereof. Then, the shorter strap members 98 are pivoted up and away from the tank, and the lower strap members 102 fall downward to a sufficient degree that the tank can be lifted out of the support frame 46 without removing the adjacent outer tank 24.

The Inlet and Outlet Tubing

Figure 6:
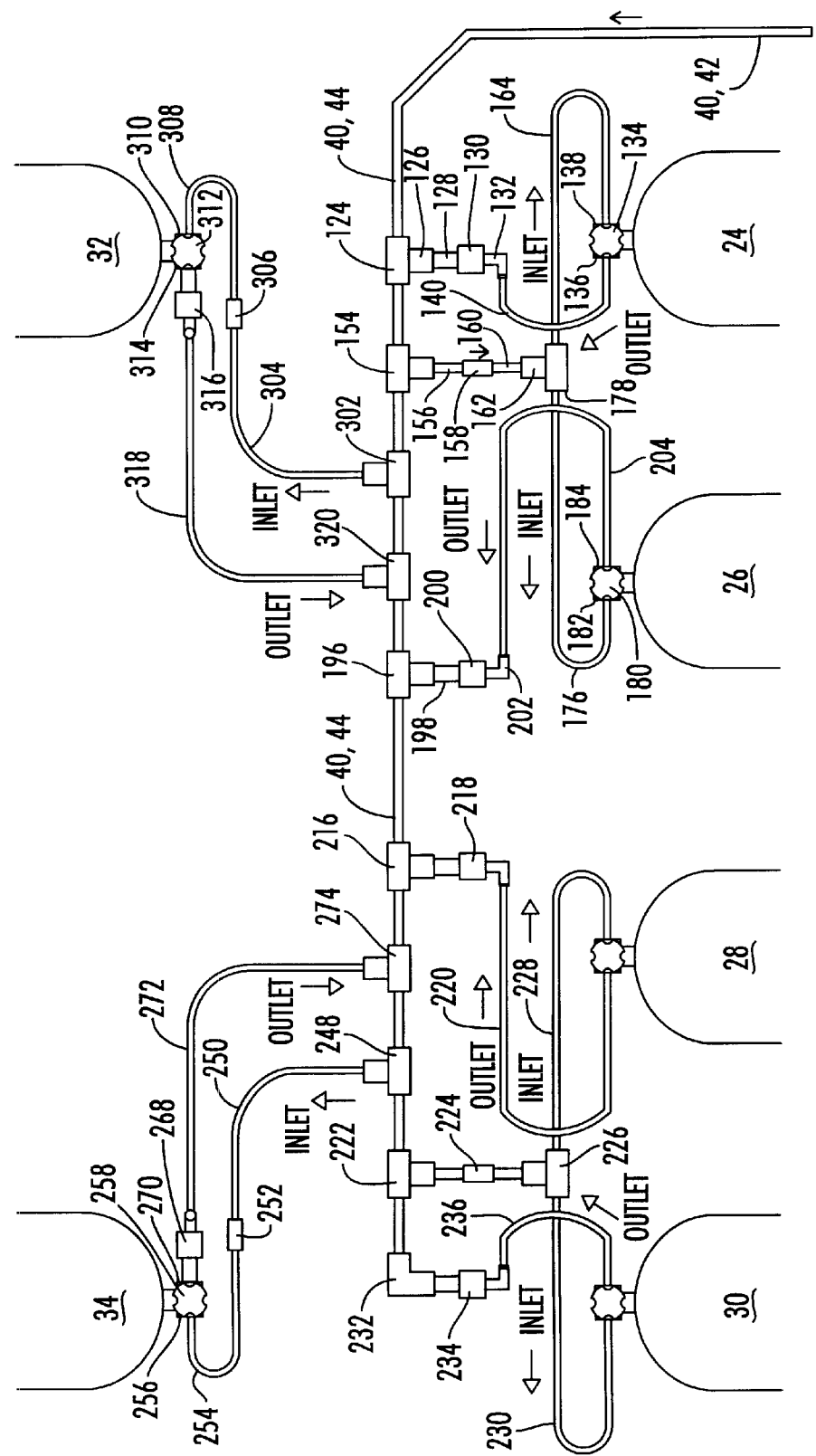
FIG. 6 is a schematic plan view showing the CNG manifold line and the inlet and outlet lines connecting six tanks to the manifold line.

Turning now to FIG. 6, a schematic plan illustration is there shown of the manner in which the transverse portion 44 of manifold line 40 is connected to the tanks 24–34.

The transverse portion 44 of manifold line 40 is anchored to the support frame 46 by clamps (not shown) which are typically spaced at approximately 24 inches apart. It is noted that codes such as NFPA (National Fire Protection Association) 52 require the anchoring of the manifold line 40 at eighteen to twenty-four inch spacings.

The transverse portion 44 is a single manifold line lying between the forward and rearward groups of tanks with all of the tanks of both the forward and rearward groups being connected to the single transverse portion 44 of manifold line 40. This is contrasted to the prior art arrangements like those used by Orion and New Flyer wherein they use two parallel transverse manifold lines, one for their forward set of tanks and the other for the rearward set of tanks.

Beginning with the first tank 22, there is a T (tee) 124 located in transverse manifold line 44. Although for purposes of ease of illustration, these components have been shown in a simplified plan view in FIG. 6, it will be understood that the transverse manifold line 44 actually lies at an elevation below that of tank 24. The center leg 126 of T 124 is actually oriented in a vertically upward direction. A short tubing nipple 128 is connected to leg 126, and a solenoid valve 130 is connected thereto. The solenoid valve 130 has a 90° elbow 132 attached thereto.

The solenoid 130 is preferably a Parker/Skinner Model MB1480-P01 high pressure solenoid valve having a 1/32 inch orifice.

The tank 24 includes a manual shutoff valve 134 mounted in its end adjacent the transverse manifold line 44. The manual shutoff valve 134 has two laterally open ports 136 and 138 defined therein on opposite sides thereof facing toward the left and right sides of the bus.

Figure 10:
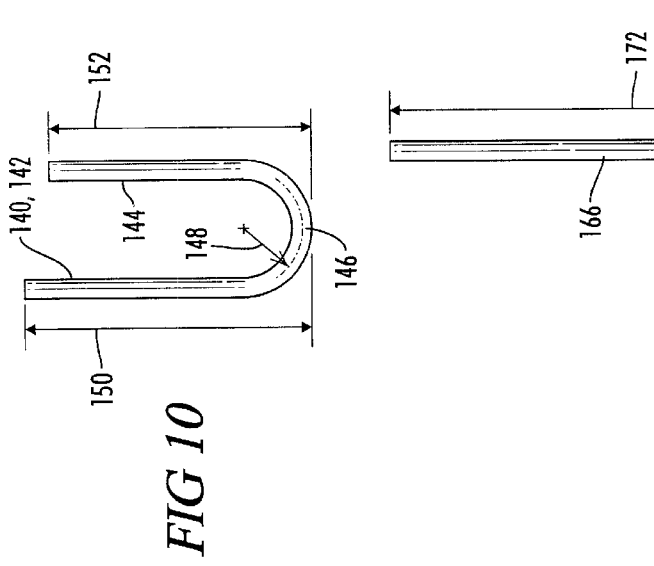
FIG. 10 is a plan view of the outlet line for tank 24. The outlet line for tank 30 is identical.

An outlet line 140 connects the solenoid 130 to the first port 136 of manual shutoff valve 134 and thus to the tank 24. The details of construction of outlet line 140 are shown in FIG. 10. Outlet line 140 is constructed of 1/2 inch nominal diameter by 0.065 inches wall thickness SS316 seamless bright annealed tubing. It has first and second legs 142 and 144 joined by a continuous 180° bend 146 which has a 1½ inch radius 148 to the center line of the tubing. The leg 142 has a length 150 of 7¼ inches and leg 144 has a length 152 of 6⅝ inches. All the dimensions of this tubing component and the others described hereafter are specified to tolerances of ±⅛ inch.

The continuous 180° bend 146 in association with the legs 142 and 144 defines a bendable expansion portion 146 which accommodates longitudinal expansion of the tank cylinder 24 relative to the transverse manifold line 44.

As will be appreciated by those skilled in the art, compressed natural gas is conventionally stored at very low temperatures, and thus when the tanks are first filled, the gas contained therein will be at a relatively low temperature. Subsequently, the CNG will warm up, thus substantially increasing its pressure, which creates the need for the specially constructed carbon fiber wrap high pressure tanks such as the Type 4 tank. These tanks are constructed to accommodate the changes in temperature and there are substantial dimensional changes of the tank due to thermal expansion. A typical Type 4 tank having a nominal capacity of 3,000 SCF/tank has a nominal length of approximately 120 inches and a nominal diameter of approximately 15.9 inches. The length of the tank can change by as much as three quarters of an inch due to thermal expansion and contraction. This expansion primarily occurs in the inner liner and the growth and length of the tank occurs at the ends, and may occur at either end. Thus, the tubing connecting the tank to the is fixed transverse manifold line 44 must be designed to accommodate as much as three quarters of an inch of movement of the manual shutoff valve 134 which is attached to the end of the tank 24.

Turning now to the other tubing connected to tank 24, there is a second T 154, nipple 156, a check valve 158, a nipple 160 and another T 162 which leads to inlet tubing 164.

The check valve 158 is preferably a Hoke 1/2 inch check valve.

Figure 11:
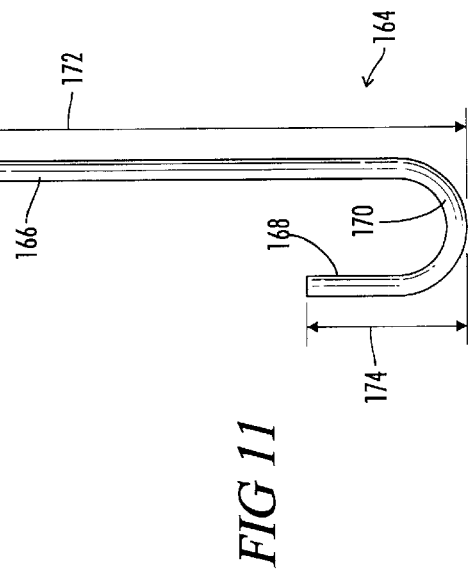
FIG. 11 is a plan view of the inlet line for tank 24.

The details of construction of inlet tube 164 are best shown in FIG. 11. Inlet tube 164 includes a longer first leg 166, a shorter second leg 168, and a continuous 180° bend 170 connecting the two legs. Leg 166 has a length 172 of 16 5/16 inches. Leg 168 has a length 174 of 4 1/16 inches. The continuous bend 170 has a 1½ inch radius to its center line. The tubing 164 is ½ inch nominal diameter by 0.065 inches wall thickness SS316 seamless bright annealed tubing.

It is noted that in the arrangement illustrated in FIG. 6, the check valve 158 serves to allow flow from transverse manifold line 44 to both the first and second tanks 24 and 26.

Figure 12:
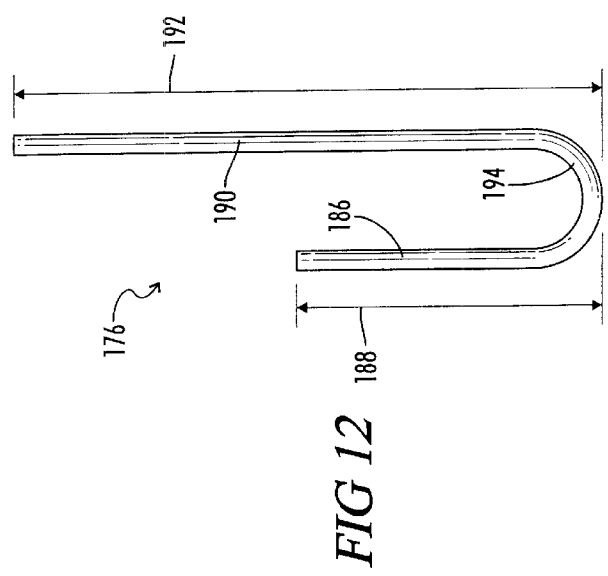
FIG. 12 is a plan view of the inlet line for tank 26. The inlet line for tank 28 is identical.

An inlet tube 176 associated with tank 26 is connected to one of the arms 178 of T 162. The tank 26 also has a manual shutoff valve 180 with ports 182 and 184. Inlet tube 176 is connected to port 182. The details of construction of inlet tube 176 are best shown in FIG. 12. Inlet tube 176 includes a short leg 186 having a length 188 of 7 11/16 inches, a long leg 190 having a length 192 of 14¾ inches, and a continuous 180° bend 194 having a 1½ inch radius to its center line. Again, the tube is constructed from ½ inch nominal diameter by 0.065 inches wall thickness SS316 seamless bright annealed tubing. The continuous bend 194 may also be described as a bendable inlet expansion portion 194 for accommodating the longitudinal movement of tank 26 due to thermal expansion.

Another T 196 is located in the transverse manifold conduit 44 and is connected by nipple 198 to a second solenoid valve 200 which controls flow of fluid out of tank 26. The solenoid valve 200 is connected to an elbow 202 which is in turn connected to an outlet line 204 which connects to the second port 184 on tank 26.

Figure 13:
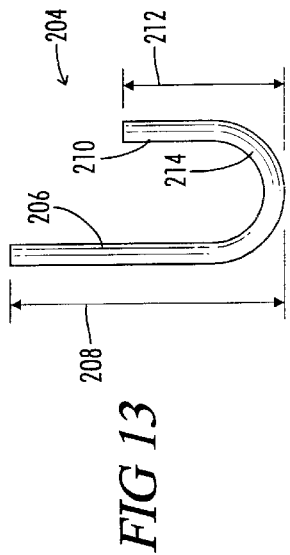
FIG. 13 is a plan view of the outlet line for tank 26. The outlet line for tank 28 is identical.

The details of construction of outlet line 204 are best seen in FIG. 13. It includes a longer leg 206 having a length 208 of 6¾ inches, a shorter leg 210 having a length 212 of 4 inches, and a continuous 180° bend portion 214 having a 1½ inch radius to its center line. The outlet line 204 is again constructed of ½ inch nominal diameter by 0.065 wall thickness SS316 seamless bright annealed tubing.

It is noted that in the embodiment illustrated in FIG. 6, the first and second tanks 24 and 26 share a common check valve 158 which controls flow of gas to their inlet lines 164 and 176. They each have separately controlled outlet or solenoid valves 130 and 200 which control flow of CNG out of the tanks back to the transverse manifold line 44 to supply fuel to the engine of the bus. It is noted that in an alternative embodiment of the invention, the function of the inlet and outlet lines can be reversed. The single check valve 158 can be replaced with a single solenoid valve controlling flow out of both of the tanks 24 and 26, and the two solenoid valves 130 and 200 can be replaced with check valves separately allowing flow of gas into the tanks when the tanks are being filled. This alternative arrangement could be desirable if more flow capacity was needed to rapidly fill the tanks 24 and 26.

It is noted that with either arrangement, the tank may be shut off by its manual shutoff valve, and the solenoid 130 or 200, regardless of where it is placed, may be removed without the need to empty and purge its associated tank. This is contrasted to prior art arrangements like that of New Flyer, wherein the solenoid valves are directly mounted in the end of the tanks, and upon failure of a solenoid valve, it is necessary to completely empty and purge two tanks to allow the solenoid valve to be removed therefrom and replaced. Two tanks must be purged because the tanks are plumbed together in pairs and there is no way to isolate them.

Turning now to the next pair of tanks 28 and 30, it will be seen that many of the tubing components associated therewith are identical to those associated with the first pair of tanks 24 and 26. In this further description it is noted that the various minor components such as nipples are not mentioned, although their presence is apparent from the drawings.

A T 216 is connected to a solenoid valve 218 which is connected to an outlet line 220 which is substantially identical in construction to the outlet line 204 previously described for tank 26.

A T 222 is connected to a check valve 224 which is connected to another T 226. An inlet line 228 from T 226 to tank 28 is substantially identical in construction to the inlet line 176 of tank 26.

The other side of the T 226 is connected to an inlet line 230 which is connected to tank 30. The inlet line 230 is substantially identical in construction to the inlet line 164 of tank 24.

An elbow 232 is connected to the end of transverse manifold line 44. A solenoid valve 234 is connected to the elbow 232 and then to an outlet line 236 connected to fourth tank 30.

Figure 14:
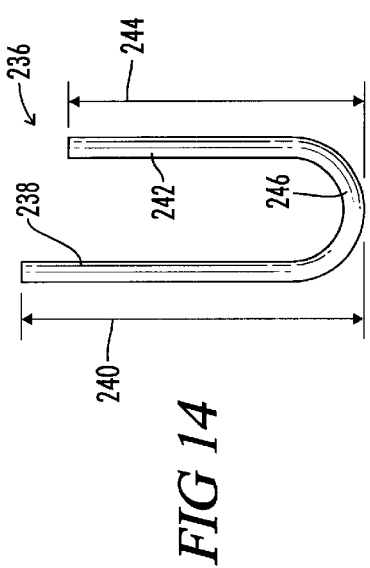
FIG. 14 is a plan view of the outlet line for tank 30.

The details of construction of outlet line 236 are best seen in FIG. 14. Outlet line 236 includes a longer leg 238 having a length 240 of 8¼ inches, and a shorter leg 242 having a length 244 of 7⅛ inches. The two legs are joined by a continuous 180° bend portion 246 having a 1½ inch radius to its center line. The outlet tube 236 is constructed from ½ inch nominal diameter by 0.065 inches wall thickness SS316 seamless bright annealed tubing.

Figure 8:
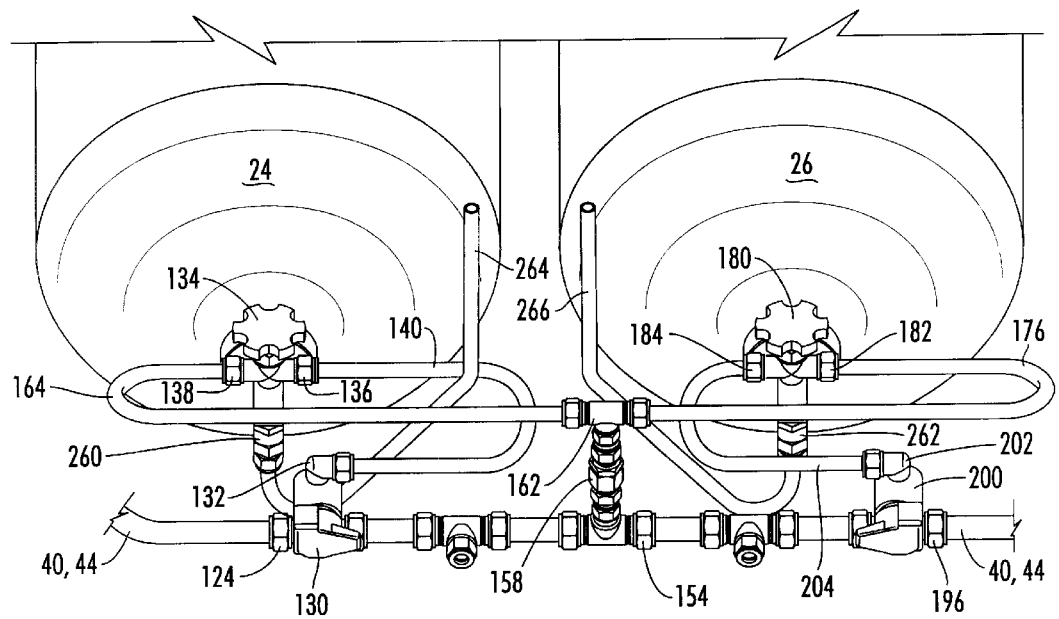
FIG. 8 is a perspective view showing the inlet and outlet lines associated with tanks 1 and 2.

FIG. 8 is a perspective view of the manifold line 44 and the inlet and outlet tubing at tanks 24 and 26. This view is taken from in front of the tanks looking rearward. In FIG. 8, pressure relief devices 260 and 262 and vent lines 264 and 266 associated with tanks 24 and 26, respectively, are also shown.

The following alternative description is also applicable to the tubing arrangement associated with first and second tanks 24 and 26. The tanks 24 and 26 can be described as extending parallel to the length of the bus both on the same side of the transverse manifold line 44.

In the following description the inlet lines are referred to as first lines and the outlet lines are referred to as second lines. This terminology allows for the possibility as noted above, that the solenoid valves and check valves may be swapped so that the first line becomes the outlet line and the second line becomes the inlet line.

The T 154, nipple 156, check valve 158, nipple 160 and T 162 provide a common first line portion connected to the manifold line 44 and having the check valve 158 disposed therein which allows flow toward the first and second cylinders 24 and 26. The T 162 is connected to or may be considered part of the common first line portion. Then, first and second hydraulically parallel separate first line portions 164 and 176 separately connect the T 162 to the first and second cylinder tanks 24 and 26, respectively, each of the separate first line portions 164 and 176 including a flexible expansion loop having a continuous 180° bend.

Each of the separate first line portions 164 and 176 may be described as including two legs each lying generally parallel to the width of the bus and the continuous 180° bend connects the two legs.

Similarly, the system may be described as including two second lines 140 and 204 connecting the manifold line 44 to the first and second tank cylinders 24 and 26, respectively, each second line 140 and 204 including a flexible expansion loop having a continuous 180° bend. In the embodiment illustrated, the first line is an inlet line and the two second lines are outlet lines, but as previously noted, the solenoid valves and check valves may be interchanged so that there is a single common outlet line and two separate inlet lines.

To this point, we have described a plurality of inlet lines 164, 176, 228 and 230 and a plurality of outlet lines 140, 204, 220 and 236. Dimensions and details of construction have been given to provide examples of bendable expansion portions having sufficient flexibility and strength to accommodate the expansion of the tanks.

Each of these inlet and outlet lines are preferably machine bent tubing pre-fabricated to specified tolerances so that pre-fabricated replacement parts may be substituted for original parts to repair the tubing system illustrated in FIG. 6.

This pre-fabricated construction to specified tolerances leads to a number of advantages.

First, it is noted that the system is designed for use with a large fleet of perhaps several hundred city transit buses utilizing substantially identical CNG fuel supply systems.

The system is preferably designed so that even within the set of tubing for one bus there will be numerous substantially identical parts such as the identical inlet tubes 176 and 228, and the other identical inlet tubes 164 and 230, and similarly there are identical outlet tubes, such as 204 and 220. This use of identical parts within a system, and then the use of identical pre-fabricated components for the CNG fuel supply system of each bus of a fleet of buses, allows the components to be pre-fabricated and interchanged between systems. It also allows an inventory of a minimum number of components to be kept for subsequent repair and replacement of the fuel systems of the buses within the fleet.

As will be understood by those skilled in the art, the machine bent tubing is manufactured on a computer numerically controlled bending machine. Such machine bent tubing can be obtained for example from Atlas Hydraulic of Brantford, Ontario, Canada.

Figure 7:
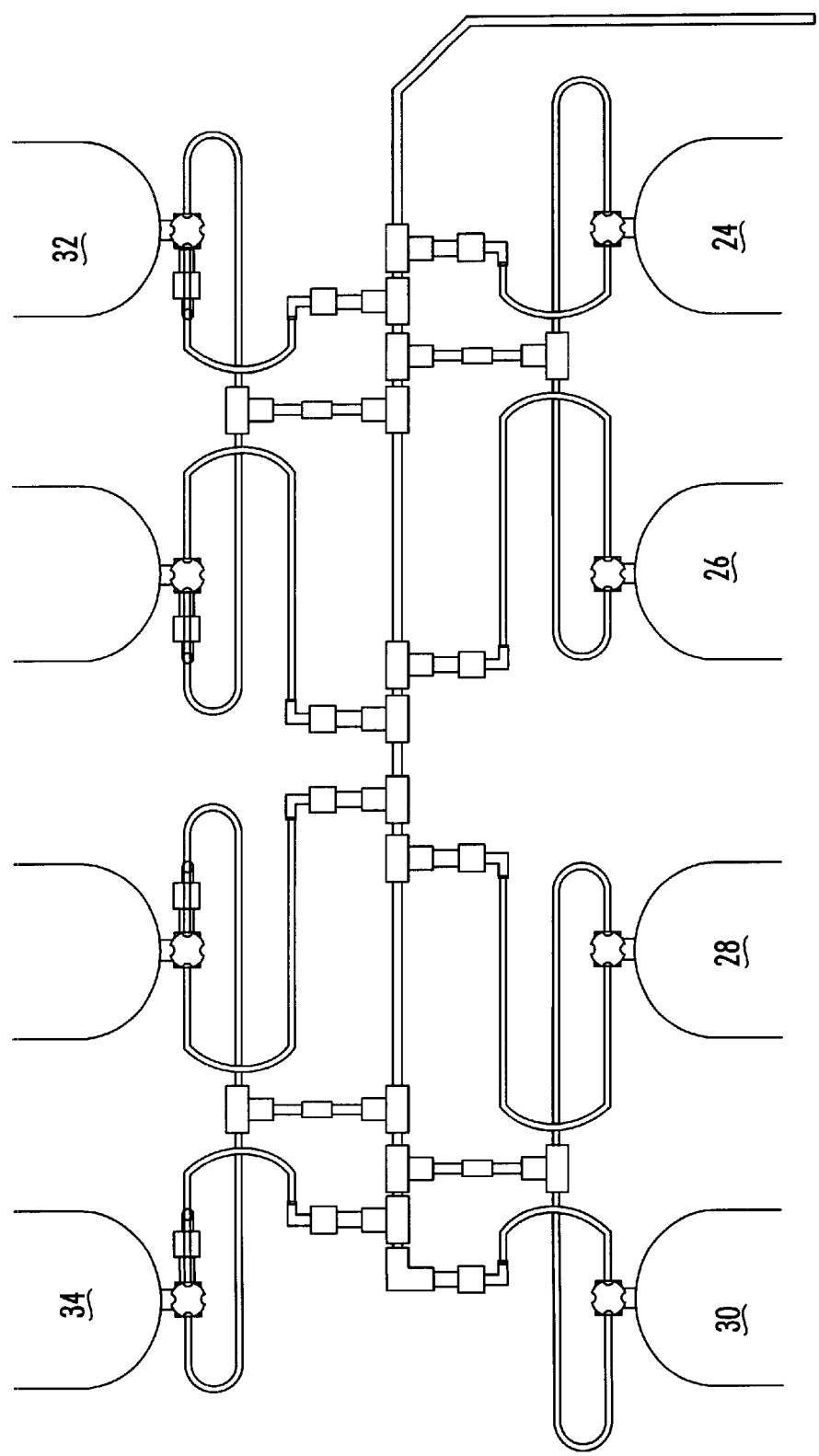
FIG. 7 is a view similar to FIG. 6 and showing eight tanks connected to the manifold line.

Continuing with the description of FIG. 6, it is noted that in FIG. 6 only two forward tanks are utilized. In this arrangement, the tubing connections to the two forward tanks will be different from those for the four rearward tanks. It is noted, however, that the system illustrated in FIG. 6 is constructed in order to be easily converted to the system shown in FIG. 7, wherein there are four forward tanks utilizing inlet and outlet tubing substantially identical to that of the four rearward tanks, thus again reducing the number of different tubing parts.

Figure 9:
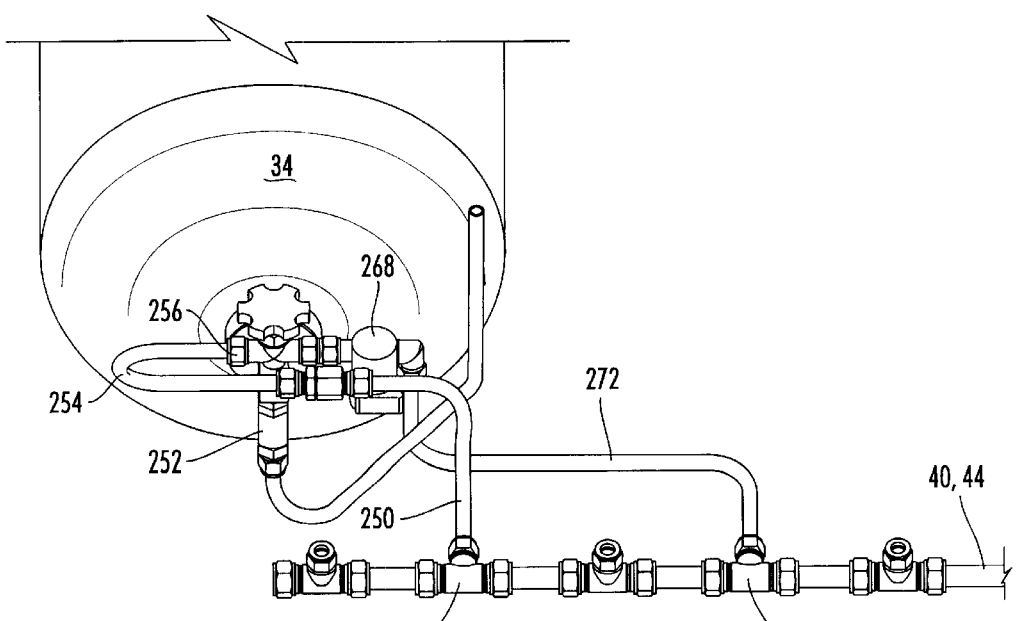
FIG. 9 is a perspective view showing the inlet and outlet lines connecting tank 6 to the manifold line.

In FIG. 6, the inlet and outlet tubing for the two forward tanks 32 and 34 is illustrated in schematic fashion. FIG. 9 shows a perspective view of the tubing connected to tank 34. FIG. 9 is a view from behind tank 34 facing forward. The physical arrangements of tubing for tanks 32 and 34 are similar to each other.

The transverse manifold line 44 includes a T 248 which is connected to a first inlet line portion 250 which is connected to a check valve 252 which is in turn connected to a second inlet line portion 254 which is connected to a port 256 on the manual shutoff valve 258. A solenoid valve 268 is connected to second port 270. An outlet line 272 connects solenoid 268 to a T 274.

Figure 15:
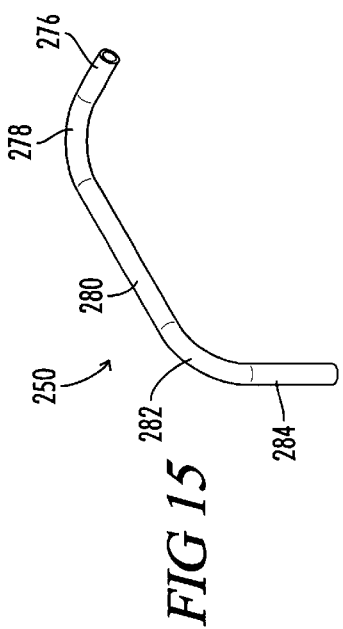
FIG. 15 is a perspective view of the first portion of the inlet line of tank 34.

The details of construction of first tubing section 250 are best shown in FIG. 15. First tubing section 250 includes a first portion 276 parallel to the length of the bus of length 3 inches, a 90° bend 278, a riser portion 280 of 8¼ inch length, another 90° bend 282, and a third portion 284 of 4¼ inch length parallel to the width of the bus.

Figure 16:
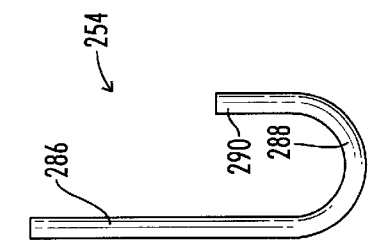
FIG. 16 is a plan view of the second portion of the inlet line of tank 34. The second portion of the inlet line of tank 32 is identical.

The details of construction of second tubing section 254 are shown in FIG. 16. The second tubing section 254 includes a leg 286 of length 8¹⁄₁₀ inches, which can be considered on extension of third portion 284. Second tubing section 286 also includes a 180° bend 288 and a shorter leg 290 of length 3⅝ inches which connects to port 256.

Figure 17:
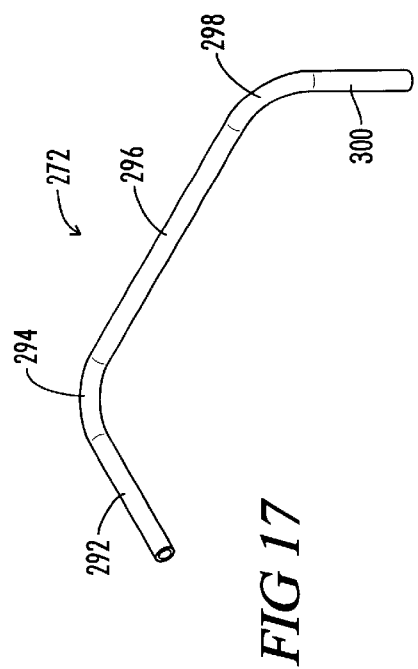
FIG. 17 is a perspective view of the outlet line for tank 34.

The details of outlet line 272 are best shown in FIG. 17. Outlet line 272 includes a first portion 292 of length 5¾ inches parallel to the length of the bus, a 90° bend 294, a second portion 296 of length 11⅞ inches parallel to the width of the bus, a second 90° bend 298, and a riser portion 300 of length 4⅝ inches connected to solenoid 268 and thus to outlet 270.

It is noted that inlet line 250 and outlet line 272 are connected to T's 248 and 274 of manifold line 44 at locations offset to the right hand side of tank 34 in FIG. 6, and the widthwise extensions of both lines extend to the left back toward the tank to define a shape in plan view as in FIG. 6 which can be described as a double dog-leg expansion loop.

The tubing connections to tank 32 as seen in FIG. 6 are essentially a mirror image of those to tank 34 seen in FIGS. 6 and 9, thus forming a second double dog-leg expansion loop extending in the opposite direction widthwise from the first double dog-leg expansion loop.

A T 302 is connected to a first inlet line portion 304, which is connected to check valve 306, which is connected to a second inlet line portion 308, which connects to port 310 on shut off valve 312. A solenoid valve 316 is connected to second port 314 of valve 312. An outlet line 318 connects solenoid valve 316 to T 320 in manifold line 44.

All the tubing components described above for the inlet and outlet lines are ½ inch nominal diameter by 0.065 inches wall thickness SS316 seamless bright annealed tubing. All 90° bends and all 180° bends are 1½ inch radius to the centerline of the tubing.

Advantages of Fleet Usage

When utilizing such a fleet of buses utilizing substantially identical CNG fuel supply systems in accordance with the present invention, each bus is provided with a plurality of roof mounted Type 4 tanks.

A plurality of pre-fabricated tubing pieces are machine bent to specified tolerances for the fuel system of each of the buses of the fleet so that the tubing pieces are interchangeable between buses. All of the dimensions of the examples which have been described above are specified to tolerances of ±⅛ inch.

Each bus is provided with a substantially identical roof mounted manifold line 40 for supplying fuel to the engine of the bus.

Each of the tanks of each bus is connected to its associated manifold line with both an inlet tubing piece and an outlet tubing piece selected from the pre-fabricated tubing pieces.

Then the fleet of buses may be maintained by utilizing substitute pre-fabricated tubing pieces kept in a maintenance inventory for repair of the fleet of buses. A minimal number of pieces will need to be maintained in the maintenance inventory, due to the fact that each of the pieces is machine bent to specified tolerances and the system is designed so that a minimum number of different shaped pieces are required and so that each bus utilizes these same identical pieces.

The Relief System

Figure 18:
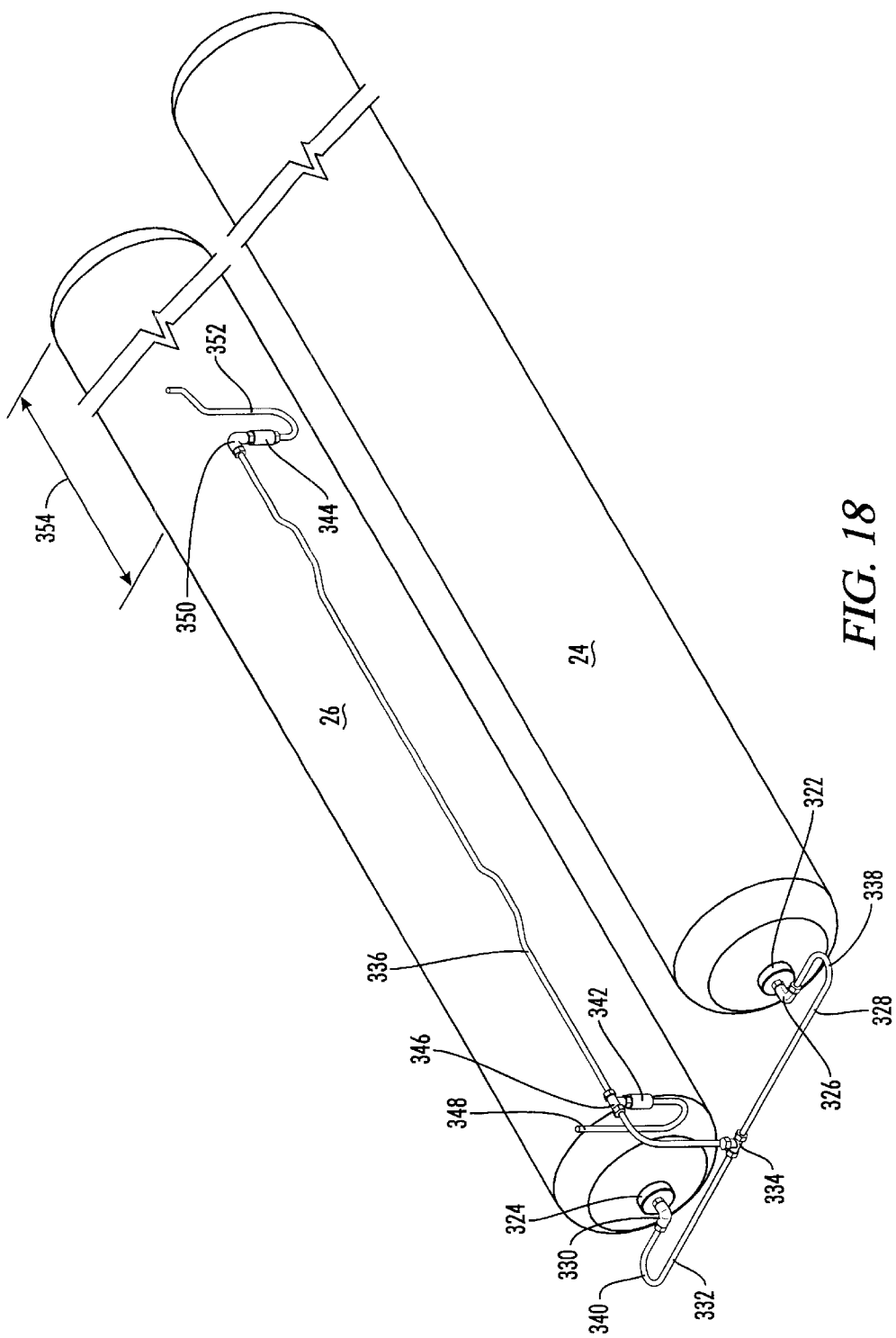
FIG. 18 is a perspective view of the pressure relief system tubing.

FIG. 18 is a perspective view of the pressure and thermal relief system associated with tanks 24 and 26. FIG. 18 is a view from the rear end of tanks 24 and 26 looking toward the front of the bus. For purposes of illustration, the supporting structure supporting the tanks 24 and 26, and other tubing connected to those tanks is not shown.

As has already been described and illustrated in FIG. 8, the forward ends of each of the tanks 24 and 26, which are the right hand ends in FIG. 18, have shutoff valves 134 and 180, respectively, attached thereto. Those shutoff valves have relief devices 260 and 262, respectively, attached directly to the shutoff valves, and they have vent lines 264 and 266 leading upward from the relief devices 260 and 262.

Additionally, there are two other pressure relief devices which are associated with the pair of tanks 24 and 26. These relief devices and their associated tubing are shown in FIG. 18.

The pressure relief devices 260 and 262 may be described as first and second relief devices attached directly to the shutoff valves 134 and 180 of first and second tanks 24 and 26, respectively.

As shown in FIG. 18, the tanks 24 and 26 have outlet couplings 322 and 324, respectively, connected to their second ends.

Outlet coupling 322 is connected to an elbow 326 which is connected to a first separate relief outlet line 328. Outlet coupling 324 is connected to an elbow 330 which is connected to a second separate relief outlet line 332.

The two separate relief outlet lines 328 and 322 connect to a common T 334 which is connected to a common relief line 336 which is located generally parallel to and lying between the first and second tanks 24 and 26.

It is noted that each of the first and second separate outlet relief lines 328 and 332 includes a continuous 180° bend portion 338 and 340, respectively, to allow flexibility in the outlet relief line to accommodate thermal expansion of the second end of the Type 4 tanks 24 and 26 relative to the outlet relief lines in a manner like that previously described for the tubing at the other end of the tanks.

Third and fourth relief devices 342 and 344 are connected to the common relief line 336.

The third relief device 342 is connected to a T 346 and the outlet of relief device 342 is connected to a vent line 348.

At the end of the common relief line 336, there is an elbow 350 which is connected to the fourth relief device 344. A vent line 352 is connected to the outlet of the fourth relief device 344.

Thus, it is seen that each of the four relief devices 260, 262, 342, and 344 can serve to relieve pressure in both of the tanks 24 and 26 if either an over pressure or an over temperature condition is sensed at any one of the relief devices. Because the two tanks 24 and 26 are connected together at their second ends by the outlet relief tubing 328, 332 they will both be relieved if either of the pressure relief devices 260 or 262 at their first ends opens or if either of the relief devices 342 or 344 in the common relief line 336 opens.

All of the relief devices utilize SAE threads to connect to their associated tubing components.

As will be understood by those skilled in the art, the primary danger to a fuel system such as that described herein is due to fire, rather than an over pressure condition. Each of the relief devices is located at positions spaced along the area covered by the pair of tanks 24 and 26, so if a fire were to occur in any area near the tanks, one of the four relief devices would soon be exposed to the excessive temperature which would cause that device to open, thus relieving pressure from both of the tanks.

As seen in FIG. 18, the third relief device 342 is located very near the second ends of the tanks 24 and 26. The fourth relief device 344 is located a distance 354 which is preferably approximately one-third the length of the tanks 24 and 26 from their first ends toward their second ends.

The relief devices are preferably a Model 91816/RV99-300, specified for 219° F. and 3600 psig relief, manufactured by Circle Seal/Hoke of Corona Calif. This unit utilizes a eutectic operational device that will either flow due to excessive pressure or melt due to excessive temperature in order to open the relief member.

The Fill Block

FIG. 1 shows the fill box 36 which as previously noted contains a fill block, filters, pressure regulators and the like. The fill box 36 provides a location where CNG can be provided from a source, such as a filling station, to fill the system 22 of the bus 10.

An improved fill block is shown in FIGS. 19–26 and is generally designated by the numeral 400. The fill block 400 includes a integral one piece body 402 which is machined from a solid block of aluminum. The body 402 has first and second ends 404 and 406 which may also be referred to as upper and lower ends 404 and 406.

The body 402 has first, second, third and fourth sides 408, 410, 412, and 414 which may also be described as front side 408, right side 410, rear side 412 and left side 414.

The body 402 has a length between its ends 404 and 406 of approximately 11 inches and its sides are approximately 3 inches wide.

The body 402 has a main bore 416 extending downwardly from the upper end 404 as best seen in FIG. 23.

The body 402 includes several counter bores 418, 420, and 422 in its upper end for receiving a ball valve assembly 424 therein. The ball valve assembly 424 functions as a shut off valve and may also be referred to herein as shut-off valve 424. The ball valve assembly 424 includes a ball valve element 426 received between upper and lower valve seats 428 and 430, respectively. The upper and lower seats 428 and 430 are received in first counter bore 418. A valve retainer element 432 is threadedly connected at 434 to the counter bore 422. Valve retainer 432 includes a coupling 436 for connecting the same to the fuel manifold line 40 seen in FIG. 1. It is noted that the line 40 will typically include a shutoff valve (not shown) adjacent to coupling 436 which functions as the inlet to the fill block.

The body 402 has a cross bore 438 which intersects counter bore 418. A valve stem mechanism 440 is inserted through one side of the cross bore 438 and engages the ball valve element 426 so as to rotate the same upon rotation of a valve handle 442.

As is apparent in viewing FIG. 23, the ball valve element is there shown in an open position wherein fluid may flow therethrough to and from the fill block bore 416. The handle 442 may be rotated 90° to move the valve element to a closed position blocking the bore 416.

The cross bore 438 is plugged on the back side by plug 439.

A short distance below the cross bore 438 and at a right angle thereto is a second cross bore 444 extending from left side 414 to right side 410 and intersecting the main bore 416. The cross bore 444 has threaded ends 446 and 448 which preferably are SAE threads.

On the backside 412 of body 402 there is seen another partial cross bore 454 which has an enlarged threaded counter bore 456. The threaded counter bore 456 provides a location for a threaded connection of the main fuel line (not shown) leading to the engine 38.

Moving on down the main bore 416, at an elevation a little over halfway down the length thereof, the main bore 416 is again intersected by two cross bores 450 and 452. Cross bore 450 runs from front side 408 to back side 412. It has a larger threaded opening 458 on the front side and a smaller threaded opening 460 on the backside. Again, all threaded openings are SAE threads.

The cross bore 452 runs from left side 414 to right side 410 and includes threaded ends 462 and 464.

As further described below, the front threaded connection 458 is a fueling port. The other threaded connections 460, 462, and 464 provide alternative connections for pressure gauges, pressure sensors and the like.

The main bore 416 has a larger upper portion 466, and then narrows to a smaller diameter lower portion 468.

The smaller diameter lower portion 468 of main bore 416 is intersected by a defueling valve bore 470 which extends from left side 414 to right side 410.

A defueling valve 472 is received in bore 470 and includes a spool valve element 474. A handle 476 is connected to spool valve element 474 for rotating the same between a defueling position and a venting position which are further described below.

The smaller diameter lower portion 468 of main bore 416 continues all the way to the lower end 406 where it is plugged by a plug 478.

Below the defueling valve bore 470, the smaller diameter lower portion 468 is again intersected by a partial cross bore 480 which has a threaded outer end connection 482. The cross bore 480 and threaded outer connection 482 may also be referred to herein as a defueling port 480, 482.

Figure 21:
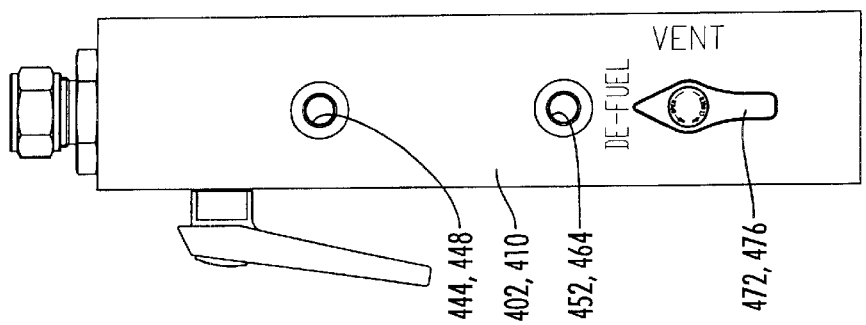
FIG. 21 is a right side elevation view of the fill block.
Figure 19:
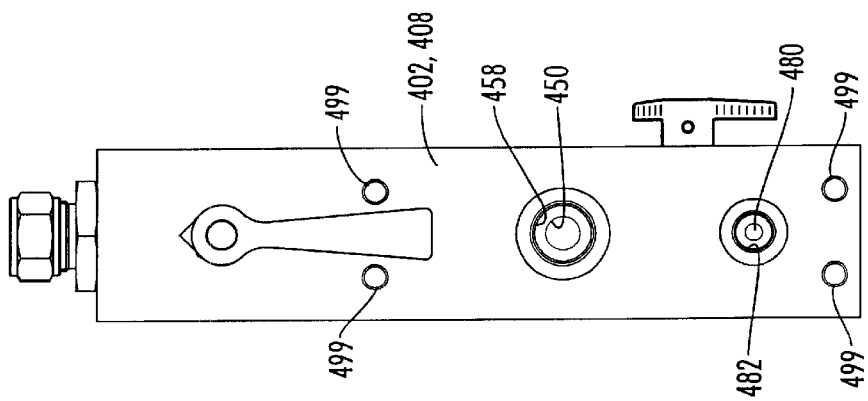
FIG. 19 is a front elevation view of the fill block.

As is seen in FIG. 21, the handle 476 is there shown in a defueling position wherein the defueling port 480, 482 is communicated with a portion of the main bore 416, above spool valve element 474 so that any fuel in the system can be relieved through the defueling port 482 in a manner further described below.

As viewed in FIG. 21, the handle 476 may be rotated 90° clockwise to a vent position, wherein the spool valve element 474 closes the smaller diameter lower portion 468 of main bore 416 so that fuel contained in the system cannot flow to the defueling port 480, 482. In this vent position, any fuel trapped below the spool element 474 is vented through a vent port 500 on back side 412 by means of a vent valve element 486 defined on the spool valve element 474.

As shown in FIG. 24, the spool valve element 474 includes first, second and third O ring seals 488, 490 and 492 which define the defueling valve portion 494 of spool element 474 and the vent valve element 486 of spool element 474.

The vent port 500 is connected to a drilled hole 502 (see FIG. 24) which intersects a vertical drilled hole 484 which intersects and crosses cross bore 472. Drilled hole 484 is plugged by plug 503.

When the spool valve 474 is in the defuel position illustrated in FIG. 24, the vent valve element 486 blocks drilled hole 484 and there is no flow to vent port 500.

When handle 476 is turned 90° to the vent position, the vertical hole 484 is opened. Vertical hole 484 communicates with defueling port 480 through a cross drilled hole 504 (see FIG. 23). Thus, when in the vent position the small amount of gas trapped between defueling valve 472 and defueling port 480 is vented to vent port 500.

Figure 20:
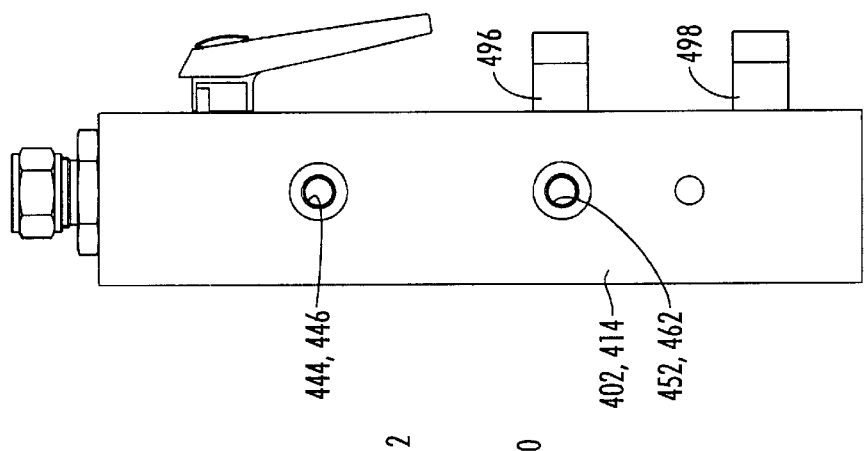
FIG. 20 is a left side elevation view of the fill block.
Figure 22:
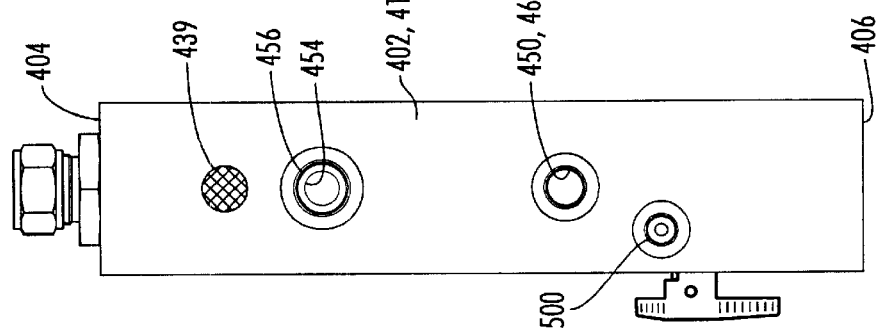
FIG. 22 is a rear elevation view of the fill block.
Figure 26:
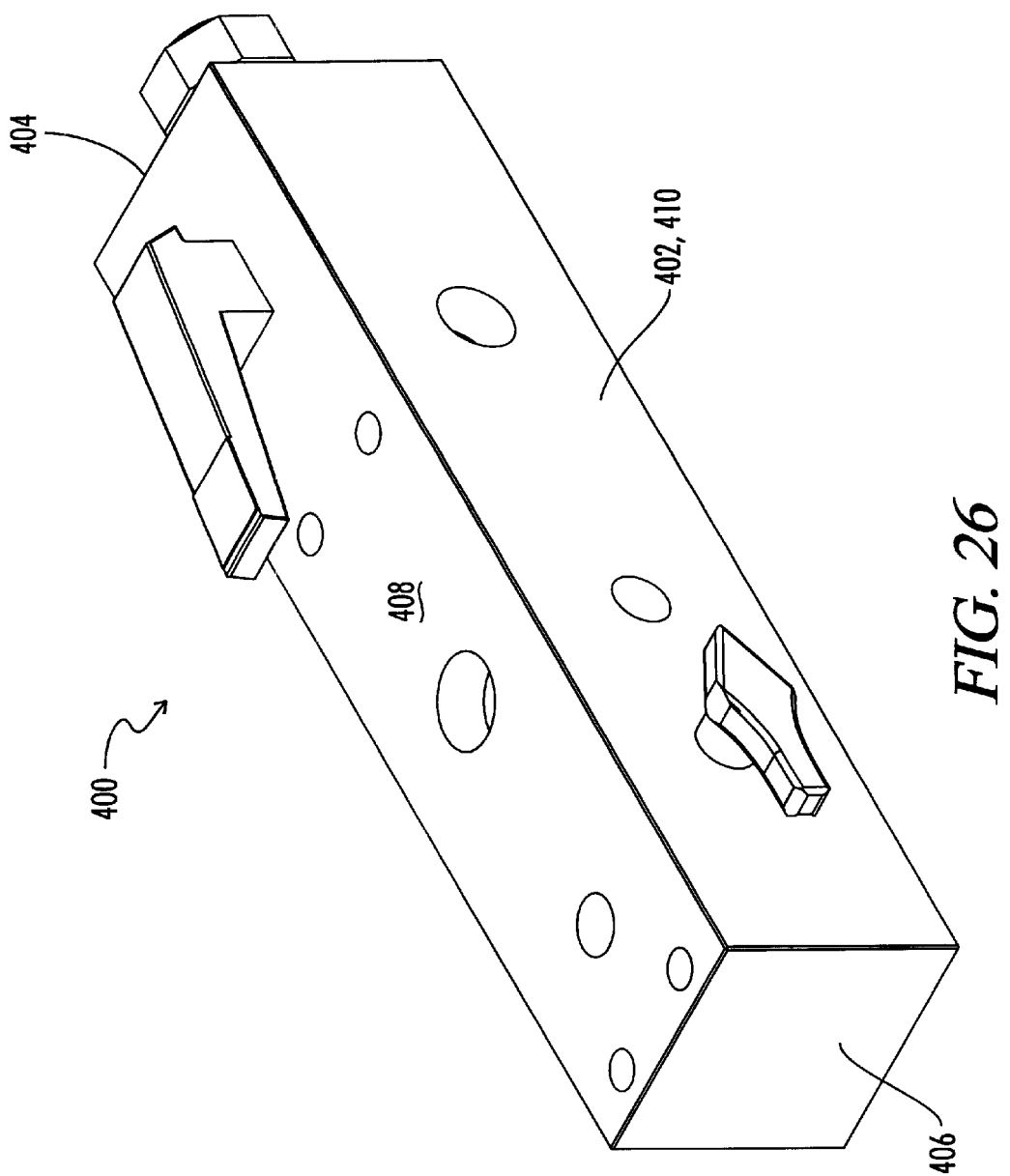
FIG. 26 is a perspective view of the fill block.

In FIG. 20, there are somewhat schematically illustrated a fueling receptacle 496 which is connected to the threaded opening 458, and a defueling receptacle 498 which is connected to the defueling port 482.

The fueling receptacle 496 may for example be a Model CL5078 fast fill receptacle manufactured by Sherex/OPW of Ohio.

The defueling receptacle 498 may for example be a Model SH2-63-643 defueling receptacle available from Parker Fluid Connectors, 17325 Euclid Ave., Cleveland, Ohio 44112.

Also seen on the front side 408 of block 402 are four shallow threaded blind bores 499, which provide a means for mounting the body 402 on the bus structure.

The operation of the fill block 400 is generally as follows.

In normal use of the bus 10, when the fuel system contains fuel and there is no desire to add or withdraw fuel from the system, the shutoff valve 424 is in its open position as illustrated in FIG. 23 so that fuel can flow to the main fuel supply port 456. The defueling valve 472 is turned to its vent position to block any flow of fuel downward past the spool element 474.

When the bus becomes low on fuel, it is driven to a filing station, and a fuel supply line is connected to the fueling receptacle 496 by merely plugging the fuel supply line (not shown) into the fueling receptacle 496. As will be understood by those skilled in the art, the fueling receptacle 496 is a female portion which mates with the male portion on the fuel line. The mating of the fuel line with the fueling receptacle 496 opens a spring loaded valve element in the fueling receptacle 496, thus allowing CNG to flow from the source at the filling station inward through the fill receptacle 496 and into the bore 416 and up through the open ball valve element 424 to the manifold line 40 which carries the fuel to the fuel tanks where it is stored.

In the event that it is necessary to service some component of the fuel system, the fuel may be exhausted from the fuel lines or the fuel tanks by connecting the defueling receptacle 498 to a line leading to a satisfactory disposal receptacle (not shown) and then the defueling valve 472 is moved to its defueling position to allow the pressurized CNG in the fuel line or manifold line 40 or the fuel tanks to flow out of the defueling receptacle 498 thus draining the desired portion of the fuel system which is open to the fill block.

Thus, it is seen that the apparatus of the present invention readily achieves the ends and advantages mentioned as well as those inherent therein. While certain preferred embodiments of the invention have been illustrated and described for purposes of the present disclosure, numerous changes in the arrangement and construction of parts may be made by those skilled in the art, which changes are encompassed within the scope and spirit of the present invention as defined by the appended claims.

What is claimed is:

1. A CNG fuel tank system for mounting on a roof of a bus, the bus having a length and a width, the system comprising:

a support frame to be mounted on the roof of the bus and including a first longitudinal frame wall extending generally parallel to the length of the bus, the first frame wall having a wall height extending vertically from the roof of the bus, and the support frame including a second longitudinal frame wall and first and second transverse walls connecting the longitudinal frame walls to define a rectangular frame;

first and second saddles, attached to one side of the first frame wall, each saddle having a base oriented vertically and engaging the first frame wall, and each saddle including an arcuate recess facing sideways from the first frame wall;

a first tank cylinder extending parallel to the first frame wall and received in the arcuate recesses of the first and second saddles;

first and second strap assemblies, associated with the first and second saddles, respectively, the strap assemblies extending around the first tank cylinder to secure the first tank cylinder to the saddles and thus to the support frame;

a second tank cylinder mounted on the first longitudinal frame wall on an opposite side thereof from the first tank cylinder;

third and fourth tank cylinders mounted on opposite sides of the second longitudinal frame wall, so that the four tank cylinders lie parallel to each other between the first and second transverse walls, the first and fourth tank cylinders being outer tank cylinders, and the second and third tank cylinders being inner tank cylinders; and wherein each of the strap assemblies associated with the inner tank cylinders includes a longer strap portion underlying its respective tank cylinder and a shorter strap portion overlying its respective tank cylinder, each strap portion having a first end pivotally connected to its associated saddle and having a second free end and each assembly including a releasable connection between the free ends of the strap portions.

2. The system of claim 1, wherein:

the support frame includes a removable central support, located between the second and third tank cylinders, for supporting a cover assembly over the tank cylinders, the central support being removable from the support frame to permit removal of either of the inner tank cylinders without removing any of the other tank cylinders.

3. The system of claim 1, wherein:

the first, second, third and fourth tank cylinders form a set of rearward tank cylinders; and the system further includes a set of forward tank cylinders also supported from said first and second longitudinal frame walls.

4. The system of claim 1, wherein:

the tank cylinders are Type 4 tanks.

5. A CNG fuel tank system for mounting on a roof of a bus, the bus having a length and a width, the system comprising:

a support frame including first and second frame walls extending parallel to the length of the bus;

a first tank cylinder lying parallel to the length of the bus and hung in a cantilever mode on the first frame wall;

a second tank cylinder lying parallel to the length of the bus and hung in a cantilever mode on the second frame wall;

a third tank cylinder hung in a cantilever mode on an opposite side of the first frame wall from the first tank cylinder;

a fourth tank cylinder hung in a cantilever mode on an opposite side of the second frame wall from the second tank cylinder; and wherein two of the tank cylinders are outer tank cylinders and two of the tank cylinders are inner tank cylinders.

6. The system of claim 5, wherein:

the support frame includes a removable center support located between the two inner tank cylinders, for supporting a cover assembly over the tank cylinders, the center support being removable from the support frame to increase ease of access to either of the inner tank cylinders for removal thereof.

7. The system of claim 6, wherein:

each of the tank cylinders is a Type 4 tank cylinder.

8. The system of claim 6, wherein:

the first, second, third and fourth tank cylinders form a set of rearward tank cylinders; and the system further includes a set of forward tank cylinders also supported from said first and second longitudinal frame walls.

9. A method of removing a tank cylinder from a CNG fuel supply system mounted on top of a bus, the method comprising:

(a) providing a support frame including first and second tank support walls and a removable central cover support lying between the tank support walls;

(b) providing first and second tank cylinders attached to opposite sides of the first tank support wall, and third and fourth tank cylinders attached to opposite sides of the second tank support wall, the first and fourth tank cylinders being outer tank cylinders, and the second and third tank cylinders being inner tank cylinders; and (c) removing one of the inner tank cylinders without removing any of the other tank cylinders.

10. The method of claim 9, further comprising:

prior to step (c), removing the removable central cover support from the support frame.

11. The method of claim 10, wherein:

step (b) further includes supporting the tank cylinders from the tank support walls with vertically oriented saddle members attached to their respective tank support walls so that arcuate recesses of the saddle members face laterally outward and receive their respective tank cylinders therein, each saddle member having an associated strap assembly strapped around its associated tank cylinder, each strap assembly of the two inner tank cylinders including a longer strap member underlying its associated inner tank cylinder and a shorter strap member overlying its associated inner tank cylinder.

12. The method of claim 11, wherein step (c) includes:

attaching a lifting device to the one inner tank cylinder to be removed;

disconnecting from each other the longer and shorter strap members of the strap assemblies associated with the one inner tank cylinder;

pivoting the associated shorter strap members away from the one inner tank cylinder; and lifting the one inner tank cylinder out of the support frame.

13. The method of claim 9, wherein:

step (b) further includes supporting the tank cylinders from the tank support walls with vertically oriented saddle members attached to their respective tank support walls so that arcuate recesses of the saddle members face laterally outward and receive their respective tank cylinders therein, each saddle member having an associated strap assembly strapped around its associated tank cylinder, each strap assembly of the two inner tank cylinders including a longer strap member underlying its associated inner tank cylinder and a shorter strap member overlying its associated inner tank cylinder.

14. A method of claim 13, wherein step (c) includes:

attaching a lifting device to the one inner tank cylinder to be removed;

disconnecting from each other the longer and shorter strap members of the strap assemblies associated with the one inner tank cylinder;

pivoting the associated shorter strap members away from the one inner tank cylinder; and lifting the one inner tank cylinder out of the support frame.

* * * * *